United States Patent

[11] 3,599,087

| [72] | Inventors | John W. Allen<br>Malvern;<br>Merrill M. Godshall, Warminster, both of, Pa. |
|---|---|---|
| [21] | Appl. No. | 14,753 |
| [22] | Filed | Feb. 24, 1970 |
| [45] | Patented | Aug. 10, 1971 |
| [73] | Assignee | Air Products and Chemicals, Inc.<br>Continuation of application Ser. No. 576,606, Sept. 1, 1966. |

[54] EDDY CURRENT TEST SYSTEM WITH MEANS FOR ELIMINATING SIGNALS DUE TO THE END OF THE TEST PIECE
11 Claims, 7 Drawing Figs.

| [52] | U.S. Cl. | 324/40 |
| [51] | Int. Cl. | G01r 33/12 |
| [50] | Field of Search | 324/34, 37, 40 |

[56] References Cited
UNITED STATES PATENTS

| 2,102,451 | 12/1937 | Zuschlag | 324/37 |
| Re. 21,003 | 2/1939 | Knerr et al. | 324/40 |
| 2,267,884 | 12/1941 | Zuschlag | 324/40 |
| 2,415,789 | 2/1947 | Farrow | 324/40 |
| 2,434,203 | 1/1948 | Farrow | 324/34 |
| 2,817,060 | 12/1957 | Stateman et al. | 324/37 |
| 2,942,178 | 6/1960 | Nerwin | 324/40 |
| 2,980,849 | 4/1961 | Dattetal. | 324/37 |
| 2,729,785 | 1/1956 | Keevil | 324/37 |
| 3,271,664 | 9/1966 | Mountz et al. | 324/37 |
| 3,343,079 | 9/1967 | Crouch | 324/37 |

*Primary Examiner*—Rudolph V. Rolinec
*Assistant Examiner*—R. J. Corcoran
*Attorneys*—Ronald B. Sherer, James C. Simmons and B. Max Klevit ABSTRACT: An eddy current material tester is described which includes a balanced bridge network. The bridge network includes a sensing coil whereby the element to be tested for flaws or defects is passed through the coil. When the ends of the element under test pass through the coil, the bridge becomes unbalanced and provides an output signal to a gate circuit which is connected to an alarm. Circuitry is included which emits signals to the gate if a flaw or defect is detected. Further circuitry is included to provide a signal if the signals emitted to the gate are of a predetermined threshold level. This level is indicative of the end of the material under test. The gate is not enabled in the presence of a signal of the predetermined threshold level. The gage is held closed for a predetermined time which may allow the end of the material to pass through the sensor coil. Defect signals are delayed before being presented to the alarm through the gate.

INVENTORS
JOHN W. ALLEN
BY MERRILL M. GODSHALL

*Edward M. Farrell*
ATTORNEY 3,599,087

EDDY CURRENT TEST SYSTEM WITH MEANS FOR ELIMINATING SIGNALS DUE TO THE END OF THE TEST PIECE

CROSS REFERENCE TO RELATED APPLICATIONS

This is a continuation of copending application Ser. No. 576,606 filed Sept. 1, 1966 for an Eddy Current Testing System in the names of John W. Allen and Merrill M. Godshall and assigned to record to Automation Industries, Inc.

This invention relates to eddy current-testing system, and more particularly to means for producing an indication when a certain condition relating to the material being examined is detected.

DISCUSSION OF THE PRIOR ART

Eddy current systems for detecting flaws in material are well known. In such systems, a coil may be disposed in close proximity to the material being tested. The material tested generally includes metal and affects the magnetic field generated by current passing through the coil. Variations in the character of the material being tested causes a change in the magnetic field of the coil so as to produce a signal change indicating a flaw within the material. This flaw may be a defect within the material such as a crack, a void, seam, an inclusion, or other defect.

Eddy current-testing systems may also be used in connection with diameter measurements of pipes, for example. They may also be used in checking various physical and chemical properties of material. For purposes of explanation, the invention will be described in connection with a flaw detection system, it being understood that the field of the invention is not limited to such flaw detection systems.

The present invention will also be described in connection with systems for testing pipes or rods. However, it is understood that it is also applicable to the testing of flat pieces, round objects such as flanges on beer cans and the like. Conceivably it may be used to detect the presence, absence or position of an element.

In general, such an eddy current-testing system may comprise an electromagnetic testing bridge network which includes a test coil disposed in close proximity to the material under test. An oscillator provides an input signal across the bridge network. Various output circuits are connected across the output of the bridge network. A balanced condition or a fixed unbalanced condition within the bridge network may indicate that there is no flaw in the material being tested. When the bridge becomes unbalanced or further unbalanced, if a fixed unbalanced arrangement is used, by the detection of a flaw within the material, an output signal is generated. This output signal is applied to various utilization circuits for analysis.

One material generally tested by eddy current-testing systems may be a metal pipe or rod. The pipe or rod is moved in close proximity to the test coil associated with the bridge network. Maximum acceptable defect levels are generally determined. Signals above adjustable threshold levels set off alarms or actuate reject mechanisms.

In the testing of tubes, pipes, metal rods and other like elements, the ends of the elements are interpreted by the bridge network as extremely large defects. Output signals are generated by the bridge network which exceed the alarm threshold level when ends are encountered. In the absence of any other precaution, the alarm would be activated.

In the past, various means, such as photo cells, have been employed to detect the ends of elements to produce signals which inactivate the alarm when the ends of the element under test are encountered. Such arrangements, while successful to some degree, have involved the use of two sensing devices. Such systems are designed so that when the element under test interrupts both sensing devices, the alarm is adapted to be made operative by a flaw signal. However, when only one of the photocells or sensing devices is actuated, the alarm system is inoperative and is not responsive to any signal generated by the ends of the element.

In addition to photocell devices, various other end sensing elements may be used. These elements may include microswitches and other types of sensors. The use of two sensors generally involves the use of well known logic circuits to operate alarms dependent upon the presence of one or two signals and other operating conditions.

In utilizing prior art systems, lengths at the leading and trailing ends of the elements which are between the two sensing devices are not tested. For example, the leading and trailing ends of the element will include lengths equal to the distance between the two sensing devices. The alarm is inactivated at these points since the element under test must generally cover both sensing devices before the alarm will be activated.

SUMMARY OF ONE EMBODIMENT

In accordance with the present invention, an eddy current system is provided for detecting a condition in an element and actuating a device or to provide an indication of the condition or flaw. Means are used to make the device or circuit nonresponsive to signals caused by the beginning and end or edges of the element being tested. A pair of networks are provided, with the networks each including a common element. The output signal from one of the networks is used to produce an output signal representing a particular condition detected within the element being tested. The second network generates a signal representing the end or edge signals of the element being tested. The end signals produce inhibit signals to prevent the alarm from being actuated or to actuate some other utilization circuit. In the absence of the end signals, alarm or other circuit will operate in a normal manner to indicate a flaw or other characteristic in the element under test.

DESCRIPTION OF A PREFERRED EMBODIMENT

In describing the present invention, references to alarm systems and reject mechanisms will be made. It is understood that the testing need not be discontinued under these conditions. The testing may be continued with the flaw areas being recorded on a recorder or the element under test being marked.

Figure 1:
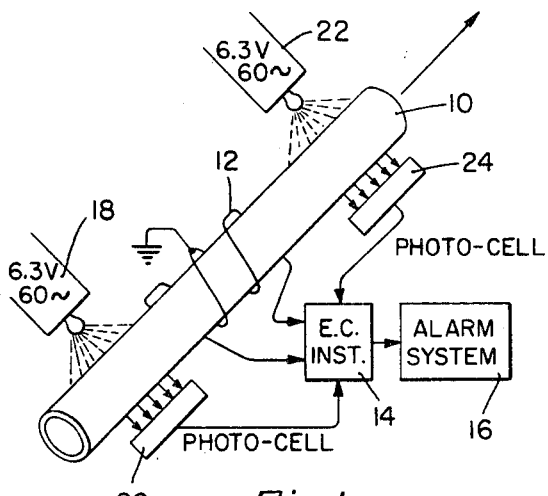
FIGS. 1, 2 and 3 represent an eddy current-testing system used in the prior art, illustrated for purposes of more clearly illustrating the advantages of the subject invention.

Referring particularly to FIG. 1, a tube or pipe 10 is moved through an eddy current test coil 12 forming a part of an eddy current instrument 14. The output signal from the eddy current instrument 14 is applied to an alarm system 16, which may also include a reject mechanism. When the pipe 10 is passing from left to right it first encounters a beam of light emanating from a lamp light source 18. The light beam, in the absence of any obstructions is picked up by a photocell 20. The output signal from the photocell 20 is applied to the eddy current instrument 14.

After the front end of the pipe 10 passes through the test coil 12 it encounters a second light beam produced by a light source 22. The light emanating from the source 22, in the absence of any obstruction, will produce a signal in the photocell 24.

The system illustrated in FIG. 1 is designed so that the alarm system 16 will be inoperative unless both of the light beams from the source 18 and 22 are interrupted by the pipe 20. For example, when the pipe 10 first breaks the light beam produced by the source 18, the photocell 24 will produce an output signal which will inhibit the operation of the alarm system 16. When the tube 10 interrupts both light beams, no inhibit signal is produced by either of the photocells 20 or 24 and the alarm system 16 will operate in a normal manner.

The eddy current instrument 14 may include various logic circuit elements such as AND and OR circuits to perform the various functioning described. Such logic circuits are well known to those skilled in the art and therefore are not shown or described in detail.

Figure 2:
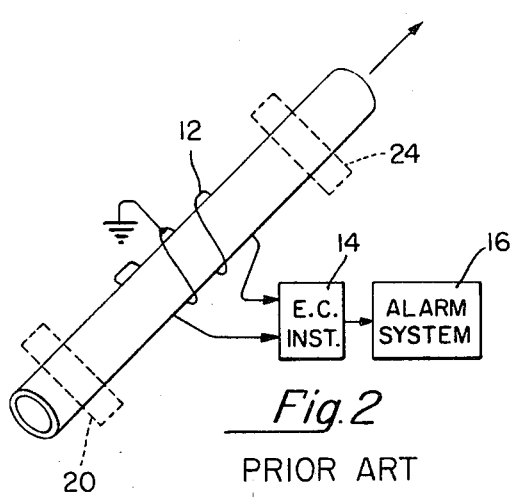

After the tube 10 has passed through the light beam produced by the source 18, the photocell 20 will produce an output signal to inhibit the operation of the alarm system 16. After the tube 10 has passed under the light beam produced by the source 22, the testing of the pipe 10 is completed and the two signals from the photocell 20 and 22 prevent the alarm 16 from operating. FIG. 2 is substantially the same as FIG. 1 and is included to more clearly illustrate the locations of the photocells in the system.

Figure 3:
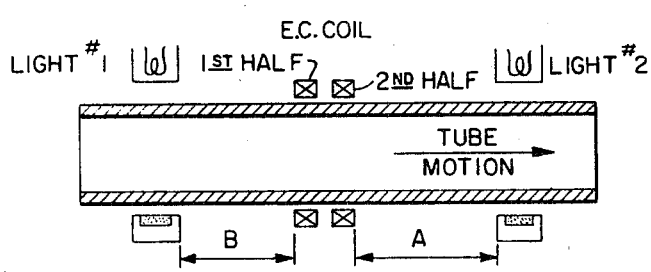

The system described has two distinct disadvantages. The first is that it does not inspect the length of the tube between the second half of the eddy current test coil and the last photocell at the start of the tube. This distance is illustrated by distance A in FIG. 3. Also, the trailing edge will not be inspected between the first photocell and the first half of the eddy current coil. This distance is represented by distance B in FIG. 3.

The use of the prior art system involving a light source and photocell has generally resulted in the disadvantage in that these elements tend to deteriorate with time from their initial performance characteristics. Also, there is the mechanical problem of foreign particles obstructing the light path, as well as the problem of photocell temperature sensitivity. The ambient light conditions in the environment in which photocells are used also sometimes produce problems.

Figure 4:
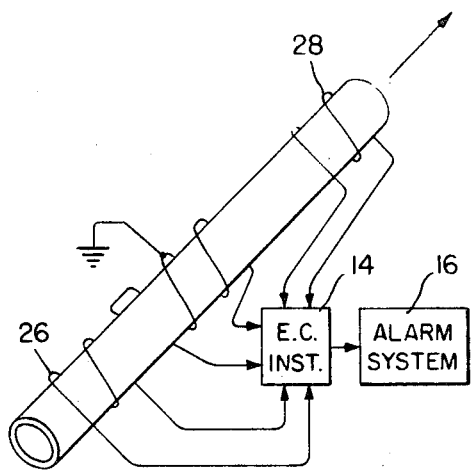
FIG. 4 is a schematic diagram of an eddy current-testing system utilizing one of the features of the subject invention.

It is possible to eliminate the use of photocells and to use coil elements to eliminate some of the problems associated with these elements. Such a system is illustrated in FIG. 4 wherein coil 26 takes the place of the elements 18 and 20 of FIG. 1, and coil 28 takes the place of elements 22 and 24 in FIG. 1. The operation of the eddy current instrument 14 and the alarm system 16 would be basically the same as that described in connection with FIG. 1.

While the use of coils instead of photocells does eliminate some of the disadvantages associated with photocells, the problem of not testing lengths of pipe at the leading and trailing ends still exist.

Figure 5:
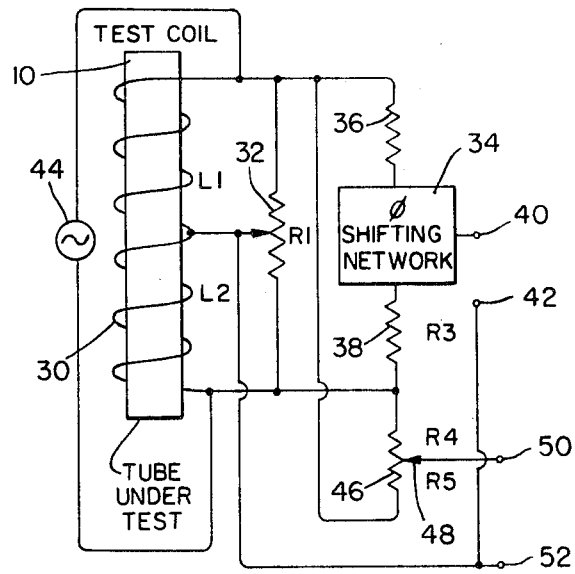
FIG. 5 is a schematic diagram illustrating a bridge network, which may be utilized in practising the present invention.

Referring particularly to FIG. 5, a bridge network which may be used with the present invention is illustrated. In this network, only one coil 30 is used for both eddy current testing and end effect sensing. The one coil 30 is used simultaneously as one-half of an unbalanced testing coil bridge of low impedance and as one-half of a balanced end effect sensing bridge of high impedance.

The first bridge may be considered as comprising the coil 30, a potentiometer 32, a phase-shift network 34 and resistors 36 and 38. The output from this bridge network is taken across a pair of output terminals 40 and 42. The phase shift network 34 provides means for adjusting the phase of the output signal and is used in many systems. It is not necessary in some cases to use such a network.

The first bridge as described represents a typical bridge network which may be used in an eddy current-testing system. An output signal from an oscillator 44 is applied across the coil 30. The pipe 10 under test is passed through the coil 30. The coil 30 is center tapped with the center tap being actuated to the movable arm of the potentiometer 32. The potentiometer 32 is used to adjust for unequal values between the two halves of the coil 30 to provide a balanced bridge, in a well known manner.

Output signals are developed at the output terminals 40 and 42 with the nature of the output signals being dependent upon the presence or absence of flaws or other mechanical or chemical properties within the pipe 10 as it moves through the coil 30. If there is a flaw in the tube 10 the bridge network will become unbalanced causing a flaw signal to be developed at the output terminals 40 and 42. The output signal from the terminals 40 and 42 are applied to various utilization circuits for analysis. Such utilization circuits are only incidentally related to the present invention and therefore are not described in detail. As previously mentioned, detection of flaws or other conditions does not necessarily result in a stopping of the testing operation. The testing may be continued uninterrupted with the conditions tested being recorded.

The second bridge for detecting the end effect of the tube 10 comprises the coil 30 along with the resistor 32 forming one-half of the bridge. The resistor 46, which may be considered as two resistors on either side of the movable arm 48, comprises the second half of the second bridge. When a signal is developed by the leading or trailing end of the pipe 10 as it passes through the coil 30, an output signal is developed at terminals 50 and 52. When an end of the pipe 10 is detected, the output signal developed at the terminals 50 and 52 will cause an alarm to be nonresponsive to any signal from the terminal 40 and 42, as will be seen. True flaw signals developed at terminal 50 and 52 not representing end signals will not be of sufficient amplitude to cause the alarm system to be nonresponsive, as will be seen. The flaw signals produced by the output terminal 40 and 42 may be of sufficient amplitude to actuate an alarm, as will be seen.

Figure 6:
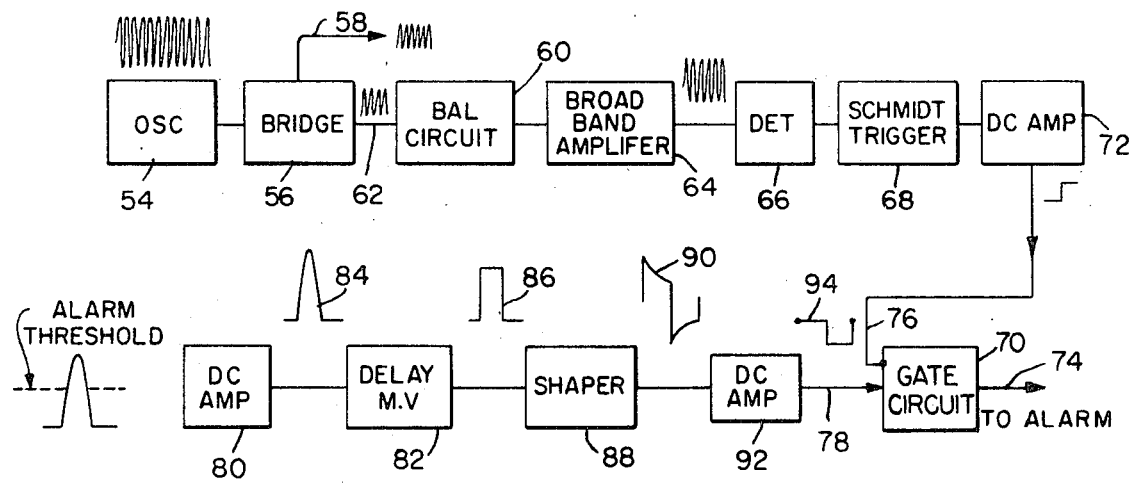
FIG. 6 is a block diagram illustrating an operation of an eddy current-testing system, in accordance with the present invention.

Referring particularly to FIG. 6, an oscillator 54 generates a signal which is applied across the pair of bridge networks described in connection with FIG. 5. The applied signal may be a sine wave signal. The pair of bridge networks is represented by a block 56, it being understood that the circuit of FIG. 5 may be incorporated into this block. One of the output signals from the bridge 56 is applied to a utilization circuit through a line 58. This signal is the output signal representing the signal test as would be developed across the terminals 40 and 42 of FIG. 5. The output signal from the second bridge portion is applied to a balance circuit 60 through a line 62. The signal at the line 62 may be that developed at the output terminal 50 and 52 of FIG. 5. It is thus seen that the test signal is applied to one path and the end effect signal is applied to a second signal path.

The output signal from the balanced circuit 60 is applied to a broad band amplifier 64. The output signal from the amplifier 64 is applied to a detector circuit 66 which provides a low direct current output voltage when the bridge is near balance. This is the condition when either no pipe is in the coil and when the tube is fully in the coil. Under these conditions, the signal developed is not high enough to trigger a bistable circuit, such as a Schmidt trigger circuit 68.

As is well known, Schmidt circuits have a characteristic of being bistable, i.e. they produce either a high or a low-output signal. Generally, to switch the Schmidt trigger circuit from one level to another it is necessary to apply an input signal exceeding some predetermined threshold level.

In the present invention, the level necessary to switch the Schmidt trigger circuit is relatively high. An end signal, generally representing an amplitude much greater than an average flaw signal, is high enough to change the Schmidt trigger circuit from one level to a second level. At the same time, flaw signals are much lower than the end signals and therefore are not of sufficient amplitude to trigger the Schmidt trigger circuit 68. The output signal from the Schmidt trigger circuit 68 is applied to gate circuit 70 from an amplifier 72.

The gate circuit 70 is designed to produce an output signal at the line 74 when the two input signals applied thereto are both low. If either signal applied to leads 76 or 78 is high, no output signal will be developed at the line 74 and the alarm will be inoperative. Consequently, a high output signal from the Schmidt trigger circuit 68 will inhibit the passage of any signals through the gate circuit 70. This means that whenever an end signal is produced, the alarm will be nonresponsive regardless of the signal condition appearing at line 78.

In the various utilization circuits mentioned, which form part of the overall eddy current-testing system, the output signals from the line 58 are analyzed. Generally, various threshold levels are set so that any output signal at the line 58 has to exceed this threshold level before the output signal will be considered a flaw signal of sufficient amplitude to actuate an alarm and reject mechanism.

The output signal from the line 58, after being analyzed in the various utilization circuits, is applied to an amplifier 80. The output signal from an amplifier 80 is applied to a delay multivibrator 82 to produce a square wave signal slightly delayed with respect to the input signal. An input signal represented by a waveform 84 produces a signal represented by the waveform 86. The output from the multivibrator 82 is applied to a shaper circuit 88 to produce a signal having a waveform 90. The output signal from the shaper circuit 88 is applied to a DC amplifier 92 to produce the signal 94. The output signal from the DC amplifier is supplied to the gate 70 through the line 78.

Only signals exceeding a threshold level, indicated in dotted lines as being an alarm level, will be developed at the output circuit of the amplifier 80. These signals represent flaw signals of sufficient amplitude to warrant possible rejection of the piece under test. They normally result in the actuation of an alarm. These flaw signals will actuate the alarm unless at the same time there is developed an end effect signal. It is noted that because of phase reversal caused by shaper 88 and DC amplifier 92, a low level signal from the amplifier 92 indicates the presence of a flaw signal and a high level indicates the absence of a flaw signal. If an end effect signal is produced, it indicates that the signal applied to the amplifier 80 is not really a true flaw signal but is a very high end effect signal having similar characteristics of a flaw signal. In this case, the signal from the Schmidt trigger circuit 68 will inhibit the passage of signals through the circuit gate 70 and the alarm will be nonresponsive. However, if there is a flaw signal applied to the amplifier 80 and the Schmidt trigger circuit 68 is not triggered, this indicates that the signal is a true flaw signal since it is not of the same magnitude of an end signal. These flaw signals will actuate an alarm or a flaw signal may be recorded on a recorder.

In describing the operations, it is realized that references to high and low signals are given to illustrate a particular embodiment. Generally, similar types of circuits may be designed to operate with opposite phases than those illustrated.

Figure 7:
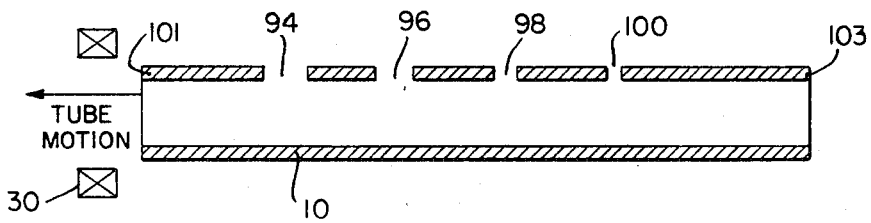
FIG. 7 illustrates a cross section of a pipe under test, along with a series of waveforms illustrating signals produced from the pipe under test, shown for purposes of illustrating the operation of the present invention.
Figure 7:
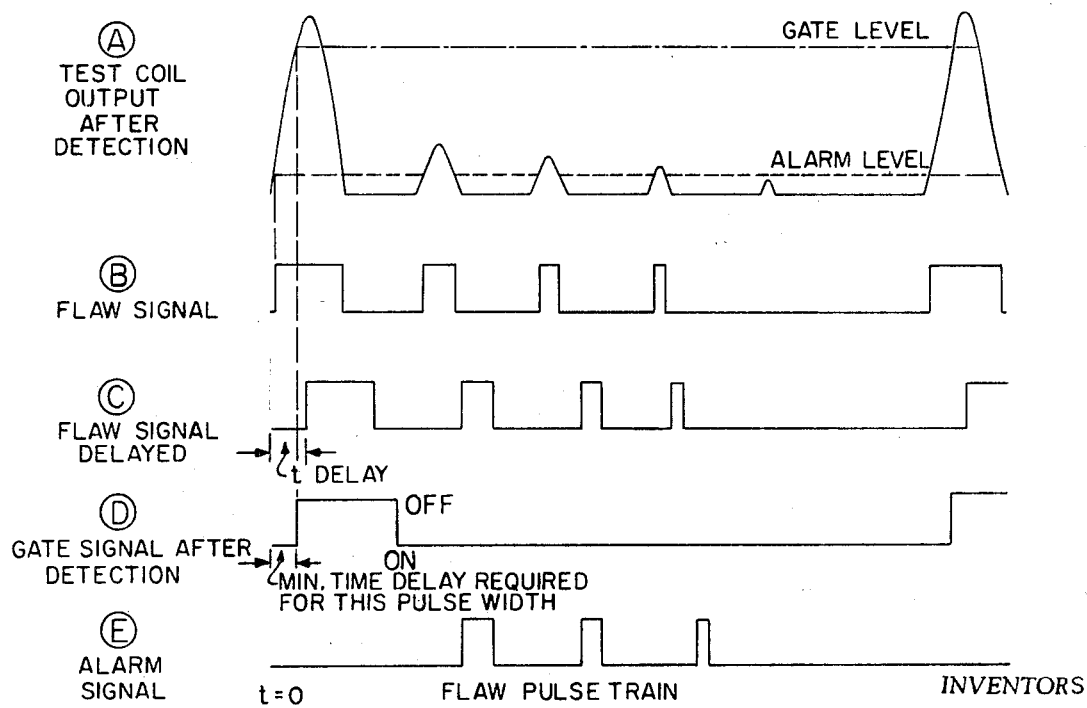

Referring particularly to FIG. 7, the pipe or tubing 10 is illustrated as being moved from right to left through the coil 30. The pipe 10 is illustrated as having a number of flaws in the form of apertures 94, 96, 98 and 100. Below the pipe 10 are a series of waveforms A through E which illustrate the various types of output signals produced for flaws in the pipe as it is moved through the test coil.

As mentioned, the leading and trailing ends 101 and 103 of the tube 10 produce very high amplitude signals. These signals are eventually used to prevent the alarm from operating when the leading end 101 of the tube 10 moves between the test coil 30 as well as when the trailing end 103 of the tube moves between the test coil 30, as described in connection with FIG. 6.

When flaw areas, illustrated as being openings within the pipe, pass through the test coils, a series of output signals are developed. If the flaw is sufficiently great, the output signal developed will exceed a predetermined threshold level indicated as being the alarm level. It is noted that these signals do not rise to the level indicated as being the gate level so as to make the alarm nonresponsive.

Waveform 7A is generated by the coil 30. When the waveform exceeds the gate level, indicating an end signal, the Schmidt trigger circuit 68 is triggered to cause an inhibit signal to be applied to the gate circuit 70. In the absence of the relatively high end signal, the gate circuit 70 will permit any applied signal thereto to produce an output signal to actuate an alarm.

The waveform 7A represents signals which are applied to the amplifier 80. As is seen, the only signals applied to the amplifier 80 are those which exceed the threshold level indicated as being the alarm level. These signals are limited by the amplifier 80 and represented by the waveform 7B.

The output signals from the amplifier 80 are applied to the multivibrator circuit 82 to produce a delayed signal indicated by the wave form 7C. This delay insures that gate 70 has sufficient time to close by virtue of the signal from amplifier 72 before the arrival of any signal from amplifier 92. The signal represented by the waveform 7D are the signals applied to the gate 70 from the line 76. Basically these signals are produced by the end signals and are held at a certain level for a predetermined length of time generally exceeding the duration of the end signal to assure that gate 70 remains closed during the entire rise and fall time of the end signal. The DC amplifier 72 includes a pulse stretcher or other means for increasing the duration of the pulse 7D by delaying its ending by a predetermined time interval. This insures the gate 70 being held closed during the interval when the end of a pipe 10 is in position where a defect cannot be resolved. It is seen that the signal from the waveform 7D will inhibit the gate circuit 70 to prevent the alarm 74 from being actuated.

As in many conventional systems, oscillators of differen. frequencies may be used for different types of testing.

It is thus seen that the present invention has provided means for making an alarm nonresponsive when relatively high signals are missing and the detected flaw signals exceed a predetermined threshold level.

The present invention has achieved a novel alarm actuating system by utilizing a common element in two bridge circuits By utilizing a common element in two bridge circuits the present invention has made it possible to test substantially the entire length of the pipe or other elements being tested. Portions of the tube at the beginning and end are tested in a manner not present in many prior art systems.

As mentioned, the present invention has been described in connection with the detection of the leading and trailing ends of pipe. This does not preclude the testing of flat pieces, round pieces and the like and the detection of edges related to such pieces.

We claim:
1. In an eddy current material tester for continually testing of elongated elements for flaws and defects, means for preventing auxiliary flow detection devices connected to said eddy current tester from indicating signals due to the ends of said elongated elements including
   a sensing coil adapted to be coupled to a small segment of said element for scanning from one end to the other en thereof, said sensing coil being adapted to provide sensed signal corresponding to the conditions of said segment;
   balancing bridge network means including said sensing coil, said bridge network means including a first output and a second output;
   first means coupled to said first output for providing a first output signal when said sensed signal is above a first preset threshold level said level corresponding to detection of the ends of the elongate element under test;
   second means coupled to said second output for providing a second output signal indicative of flaws and defects of the material under test; and
   gating means coupled to said first means and responsive to said first output signal, said gating means remaining CLOSED during said first output signal and OPEN in the absence of said first output signal, said gating means being coupled to said second means for providing an output signal in the absence of the first output signals from said first means and the presence of the second output signal from said second means, thereby eliminating from the output of the gating means those sensed signals due to the ends of said elongated elements.

2. In the tester defined in claim 1 and further including
a delay means coupled between said second means and said gating means for delaying the second signal for a sufficient time interval to insure the first signal from said first means arriving at said gating means before said second signal.

3. The tester as defined in claim 1 and further comprising
means coupled between said first means and said gating means, said last means being effective to maintain said gating means CLOSED for a predetermined time interval after said first output signal to assure closing of the gating means before and after the arrival of the second output signal from said second means.

4. The tester as defined in claim 1 and further including
a delay means coupled between said second means and said gating means for delaying the beginning of said second output signal until after the beginning of said first output signal from said first means to said gating means; and
means coupled between said first means and said gating means, said last means being effective to maintain said gating means CLOSED from before the beginning of a second output signal from said second means until after the end of said second output signal.

5. An eddy current material tester including a sensing coil for scanning a workpiece and providing a signal corresponding to the characteristics of said workpiece;
a first balanced bridge network including said sensing coil, said first bridge network being adapted to produce a first signal in response to flaws or defects in said workpiece;
a second balanced bridge network including said sensing coil, said second bridge network being adapted to provide a second signal indicative of the end of the workpiece;
a threshold detector coupled to said second balanced bridge and responsive to the signals from said second bridge to provide a control signal when the second signal from said balanced bridge network exceeds a predetermined threshold level said level corresponding to detection of the ends of the workpiece under test; and
gating means coupled to said first balanced bridge network for passing electrical signals from said first balanced bridge circuit, said threshold detector being coupled to said gating means for allowing the first signal from the first bridge network to pass therethrough in the absence of a signal from said second balanced bridge circuit above the predetermined level and inhibiting said first signals from said first balanced bridge network passing therethrough in the presence of a signal from said second balanced bridge circuit above the predetermined level.

6. The eddy current material tester as defined in claim 5 including
delay means coupled between said first balanced bridge network and said gating means to delay the electrical signal from said first balanced bridge network before reaching the gating means.

7. The eddy current material tester as defined in claim 5 and further including
means coupled between said second balanced bridge network and said gating means, said last means being responsive to said control signal from the threshold detector to inhibit the passage of the first electrical signal through the gating means that extends from before until after the arrival of the electrical signal from said first balanced bridge network.

8. The eddy current material tester as defined in claim 5 and further including
delay means coupled between said first balanced bridge network and said gating means to delay the first signal from said first balanced bridge before reaching said gating means; and
means coupled between said second balanced bridge network and said gating means, said last means being responsive to said control signal inhibiting the passage of said first signal through said gating means for a period extending from before until after the arrival of the first signal from said first balanced bridge network.

9. In an eddy current material tester for continually testing of elongate elements for flaws and defects, means for preventing auxiliary flow detection devices connected to said eddy current tester from indicating signals due to the ends of said elongated elements including
a sensing coil for scanning said element from one to the other end, said coil being adapted to provide a sensed signal indicative of the conditions of said element;
first means coupled to said sensing coil for providing a control signal when said sensed signal is above a predetermined threshold level said level corresponding to detection of the ends of said element under test;
second means coupled to said sensing coil for providing a test signal indicative of flaws and defects of the material under test; and
gating means coupled to said first means and said second means and responsive to the control signal and to the test signal, said gating means being effective to provide an output signal in the absence of a control signal from said first means and the presence of a test signal from said second means, thereby eliminating from the output of the gating means those sensed signals due to the ends of said elongated elements.

10. In the tester as defined in claim 9 and further including
a delay means coupled between said second means and said gating means for delaying the test signal from said first means by a predetermined interval before reaching said gating means.

11. The tester as defined in claim 9 and further including
a delay means coupled between said second means and said gating means for delaying the signal from said second means to said gating means; and
means coupled between said first means and said gating means and responsive to the signal from said first means for closing the gate before the arrival of the delayed signal from said second means and maintaining said gating means closed until after said delayed signal.